United States Patent [19]

Bamer

[11] Patent Number: 4,879,898
[45] Date of Patent: Nov. 14, 1989

[54] APPARATUS FOR SHIELDING AND PROTECTING AN AIR FLOW RATE METER DISPOSED IN THE INTAKE TUBE OF AN INTERNAL COMBUSTION ENGINE FROM AIR COLUMN FLUCTUATIONS

[75] Inventor: Franz Bamer, Vienna, Austria

[73] Assignee: Robert Bosch GmbH, Stuttgart, Fed. Rep. of Germany

[21] Appl. No.: 710,890

[22] Filed: Mar. 12, 1985

[30] Foreign Application Priority Data

May 9, 1984 [DE] Fed. Rep. of Germany ....... 3417052

[51] Int. Cl.⁴ .......................................... G01F 15/02
[52] U.S. Cl. ................................ 73/118.2; 73/199; 73/202.5
[58] Field of Search ............... 73/118, 198, 199, 202, 73/204, 17, 202.5, 118.2

[56] References Cited

U.S. PATENT DOCUMENTS

| 4,141,240 | 2/1979 | Usui et al. | 73/199 |
| 4,280,360 | 7/1981 | Kobayashi | 73/198 |
| 4,478,075 | 10/1984 | Oyama et al. | 73/118 |

FOREIGN PATENT DOCUMENTS 0160817 9/1983 Japan ............................ 73/204

*Primary Examiner*—Herbert Goldstein
*Attorney, Agent, or Firm*—Edwin E. Greigg

[57] ABSTRACT

An apparatus for shielding and protecting an air flow rate meter from air column fluctuations arising in an intake tube from the aspirating action of an internal combustion engine is proposed. An air flow rate meter is disposed in a bypass line around the intake tube, and downstream of the air flow rate meter and in its vicinity there is a damping chamber, which communicates with the bypass line and keeps air fluctuations from affecting the air flow rate meter.

5 Claims, 2 Drawing Sheets

APPARATUS FOR SHIELDING AND PROTECTING AN AIR FLOW RATE METER DISPOSED IN THE INTAKE TUBE OF AN INTERNAL COMBUSTION ENGINE FROM AIR COLUMN FLUCTUATIONS

BACKGROUND OF THE INVENTION

The invention is based on an apparatus as generically defined hereinafter. When air flow rate meters are used in the intake tube of internal combustion engine, the problem arises that in certain engine operation ranges, very severe pulsations in the aspirated air cause a falsification of the measurement signal, as a result of which fact reversals in the flow direction occur but are not recognized as such by the air flow rate measuring device. It has therefore been suggested previously that the flow measurement be interrupted when the pulsation amplitudes are very high; however, this is unsatisfactory because it does not bring about a correction of or compensation for the pulsation error.

OBJECT AND SUMMARY OF THE INVENTION

The apparatus according to the invention has the advantage over the prior art that sufficiently accurate measurement of the air mass in the intake tube of the engine is attained, even when pulsations occur. By disposing at least one damping chamber in the vicinity of the air flow rate meter, disruptive fluctuations are absorbed and kept from affecting the air flow rate meter.

It is particularly advantageous, in an air flow rate meter disposed in a bypass line bypassing the intake tube, to connect the bypass line downstream of the air flow rate meter, and optionally the bypass line upstream of the air flow rate meter as well, with a respective damping chamber, so that no pulsations can reach the air flow rate meter via the bypass line.

It is also advantageous, in an air flow rate meter disposed in a carrier ring in the intake tube, to provide one annular tube each concentrically upstream and downstream of the carrier ring, the annular tubes each leading to a respective damping chamber, so that the air flowing through the carrier ring is free of pulsations.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
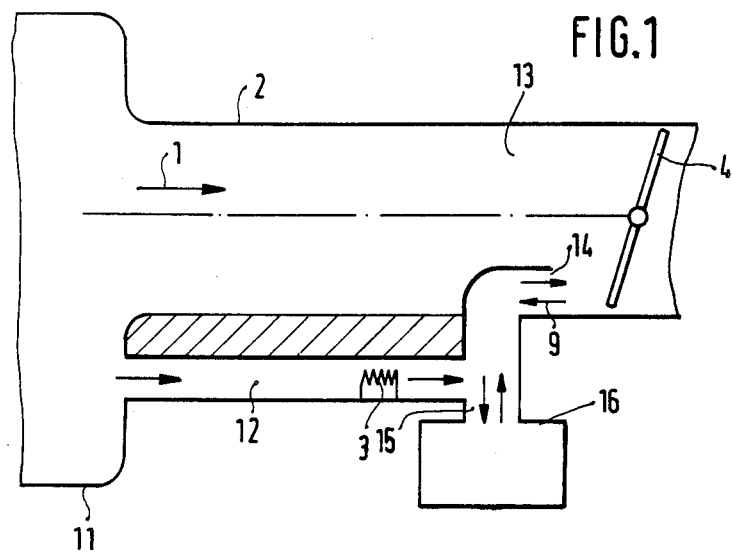
FIG. 1 shows a first exemplary embodiment of an apparatus according to the invention on the intake tube of an internal combustion engine.

In the exemplary embodiment shown in FIG. 1, combustion air flows in the direction of the arrow 1, downstream of an air filter (not shown), into an intake tube 2 having an air flow rate meter 3 and a throttle valve 4 to an internal combustion engine, not shown. Here, 11 indicates an air filter housing, at one end of which the intake tube 2 begins and at the other end of which a bypass line 12 around the intake tube 2 begins. At a narrowed cross section 13 of the intake tube 2, the bypass line 12 discharges into the intake tube again at 14. An air flow rate meter 3 of a known type, embodied for instance as a hot wire or hot film flow rate meter, is disposed in the bypass line 12. A connecting line 15 leads from the bypass line 12 downstream of the air flow rate meter 2 to a damping chamber 16. Now if reverse flows in the direction of the arrows 9 occur via the discharge location 14, then fluctuations are intercepted in the damping chamber 16. In the vicinity of the air flow rate meter 3, no further reverse flows now occur in the bypass line 12, so that the air flow rate meter 3 furnishes a correct measurement signal.

Figure 2:
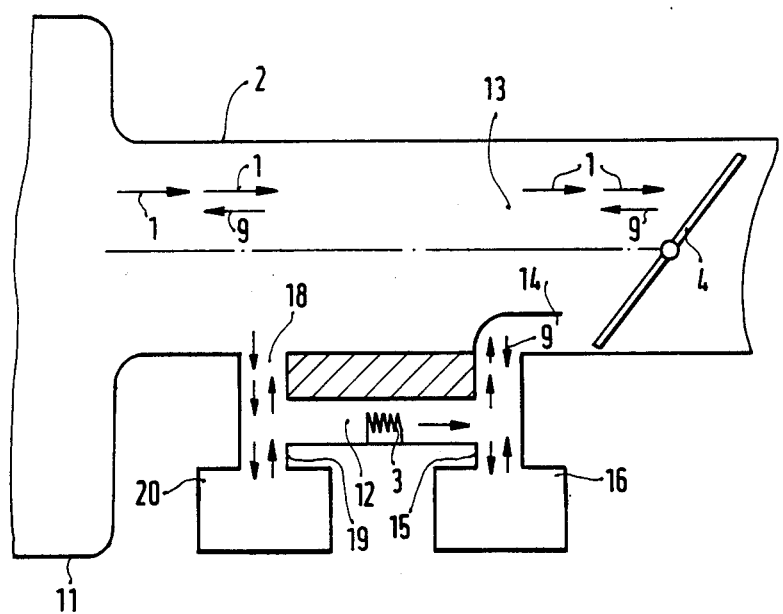
FIG. 2 shows a second exemplary embodiment of an apparatus according to the invention on the intake tube of an internal combustion engine.

The second exemplary embodiment of the invention shown in FIG. 2 has been provided with the same reference numerals for elements functioning the same as those in FIG. 1. Differing from the exemplary embodiemnt of FIG. 1, the bypass line 12 here begins at 18 on the intake tube 2 and communicates upstream of the air flow rate meter 3 with a further connecting line 19, which leads to a further damping chamber 20, can cancel out air fluctuations. Since in the exemplary embodiment of FIG. 1 reverse flows are cancelled out in the air filter housing 11 and are thus incapable of affecting the air flow rate meter from upstream, in the exemplary embodiment of FIG. 1 no pulsations from upstream of the air flow rate meter 3 occur. In contrast to this, in the exemplary embodiment of FIG. 2 reverse flows can also have an effect via the beginning 18 of the bypass line 12, so that in addition to the damping chamber 16 a further damping chamber 20, which communicates with the bypass line 12 upstream of the air flow rate meter 3, is provided, in order to assure that no pulsations will have an effect at the air flow rate meter 3.

Figure 3:
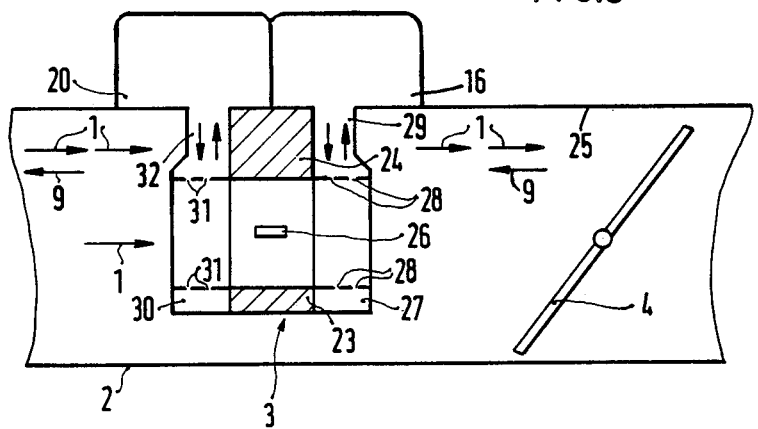
FIG. 3 shows a third exemplary embodiment of an apparatus according to the invention on the intake tube of an internal combustion engine.

In the exemplary embodiment of FIG. 3, the elements functioning the same as those in the preceding embodiments are identified by the same reference numerals. Thus the air flow rate meter 3, in a known manner, has a carrier ring 23, embodying a measuring cross section, which is held spaced apart from the intake tube wall 25 by a strut 24.

A temperature-dependent resistor 26, embodied for instance as a hot film or hot coating resistor, is disposed in the cross section formed by the carrier ring 23, acting as the measuring resistor of the air flow rate meter and being applied to a substrate in a known manner. Instead of the hot film or hot coating resistor, a hot wire may likewise be stretched out in the carrier ring 23, as is shown in the foregoing exemplary embodiments. Downstream and in alignment with the carrier ring, a first annular tube 27 is disposed on the carrier ring 23 in the intake tube 2, being vented toward the intake tube 2 via openings 28 and communicating via a connecting line 29 with the first damping chamber 16. Upstream of the temperature-dependent resistor 26 and in alignment with the carrier ring 23 in the intake tube 2, there is a second annular tube 30 disposed on the carrier ring 23, communicating with the intake tube 2 via openings 31 and with a second damping chamber 20 via a connecting line 32. By means of the disposition in accordance with the invention of the first damping chamber 16 and the second damping chamber 20, a pulsation-free flow is assured, in the manner already described above, at the temperature-dependent resistor 26.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for shielding and protecting an air flow rate meter, having a temperature-dependent resistor, which measures the mass of air aspirated by an internal combustion engine, from air column fluctuations arising in an intake tube of an engine as a result of the aspirating action of the engine, which includes an air intake tube, a conduit means connected with said air intake tube for aspirating air therethrough, said air flow rate meter is disposed in said conduit means through which a portion of said aspirated air mass flows, a first damping chamber connected to said conduit means via only one flow connection upstream of said air flow meter, and a second damping chamber connected to said conduit means downstream of said air flow rate meter and arranged to communicate with said conduit means via only one flow connection in the vicinity of said air flow rate meter.

2. An apparatus as defined by claim 1, characterized in that said conduit means is disposed along side said intake tube, and said second damping chamber communicates with said conduit means and said intake tube downstream of the air flow rate meter.

3. An apparatus as defined in claim 1, characterized in that said first damping chamber is arranged to communicate with said air intake tube upstream of said air flow rate meter.

4. An apparatus for shielding and protecting an air flow rate meter, having a temperature-dependent resistor, which measures the mass of air aspirated by an internal combustion engine, from air column fluctuations arising in an intake tube of an engine as a result of the aspirating action of the engine, characterized in that said air flow rate meter is disposed in a conduit means through which a portion of said aspirated air mass flows, a first damping chamber upstream of said air flow rate meter, and connected to said conduit means, and a second damping chamber downstream of said air flow rate meter arranged to communicate in the vicinity of said air flow rate meter with said conduit means, said conduit means is embodied by a carrier ring disposed in said intake tube spaced apart from a wall of said intake tube, said carrier ring having a temperaturedependent resistor supported therein, a first annular tube immediately downstream from and in alignment with the carrier ring, said first annular tube being open toward the intake tube and leading to said second damping chamber, and a second annular tube directly upstream of said carrier ring in alignment therewith, said second annular tube being open toward said intake tube and leading to said first damping chamber.

5. An apparatus for shielding and protecting an air flow rate meter, having a temperature-dependent resistor, which measures the mass of air aspirated by an internal combustion engine, from air column fluctuations arising in an intake tube of an engine as a result of the aspirating action of the engine, characterized in that said air flow rate meter is disposed in a conduit means through which a portion of said aspirated air mass flows, a first damping chamber upstream of said air flow rate meter, and connected to said conduit means, an air filter housing communicating with said intake tube of said engine, a portion of said air filter housing forming said first damping chamber, and a respective connecting line leads from said conduit means to said first damping chamber formed by a portion of said air filter housing, and a second damping chamber downstream of said air flow rate meter arranged to communicate in the vicinity of said air flow rate meter with said conduit means.

* * * * *